J. H. LANGLEY.
PNEUMATIC CONTROL SYSTEM.
APPLICATION FILED OCT. 3, 1918.
1,428,643.
Patented Sept. 12, 1922.
4 SHEETS—SHEET 4.
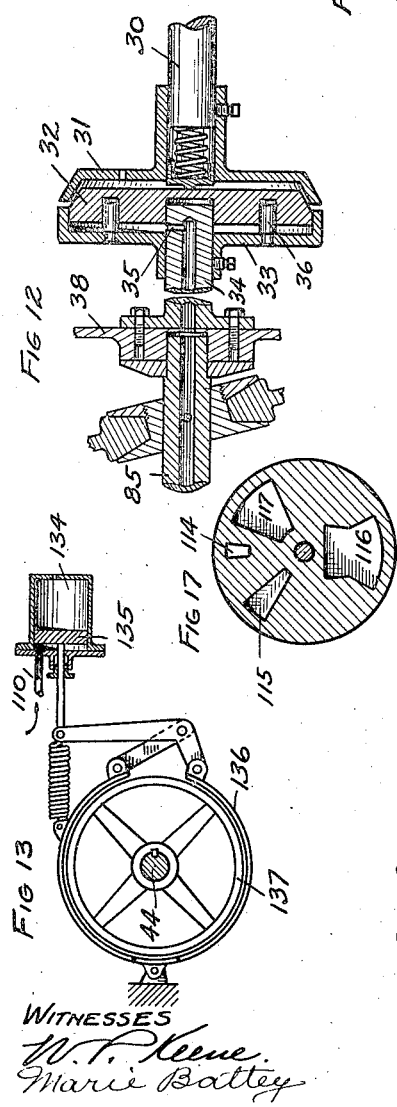
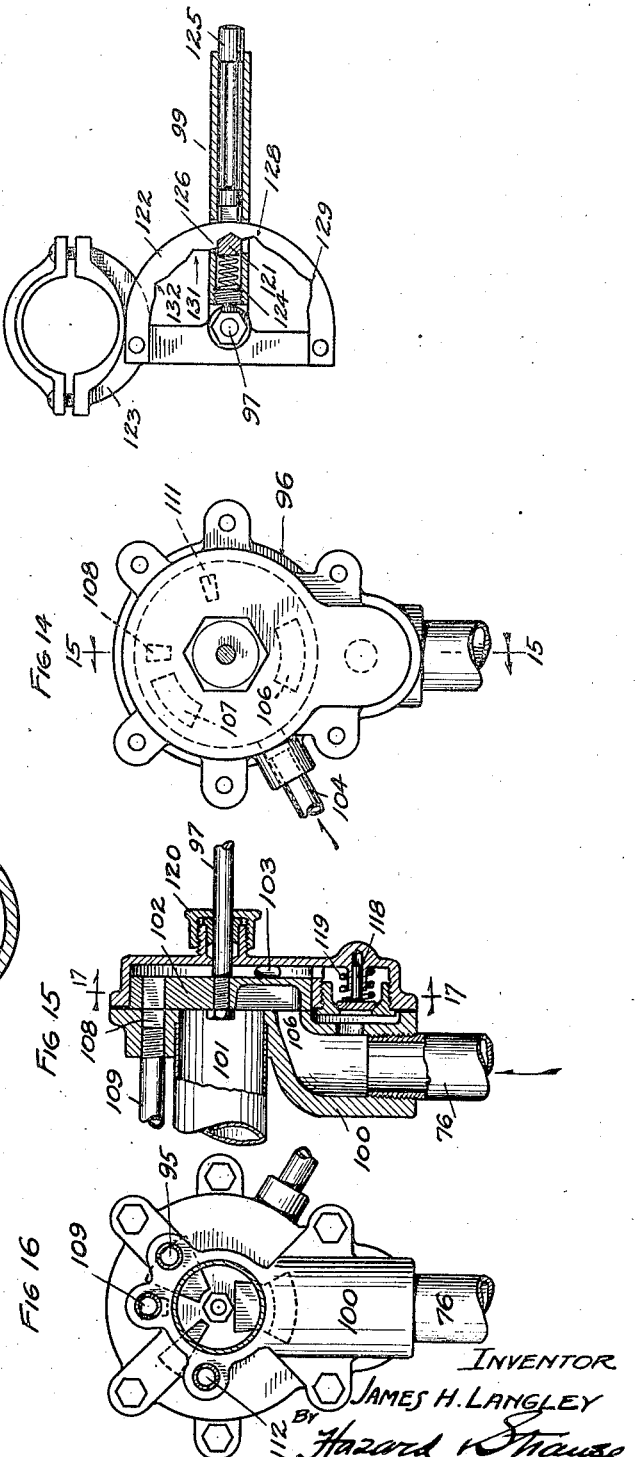

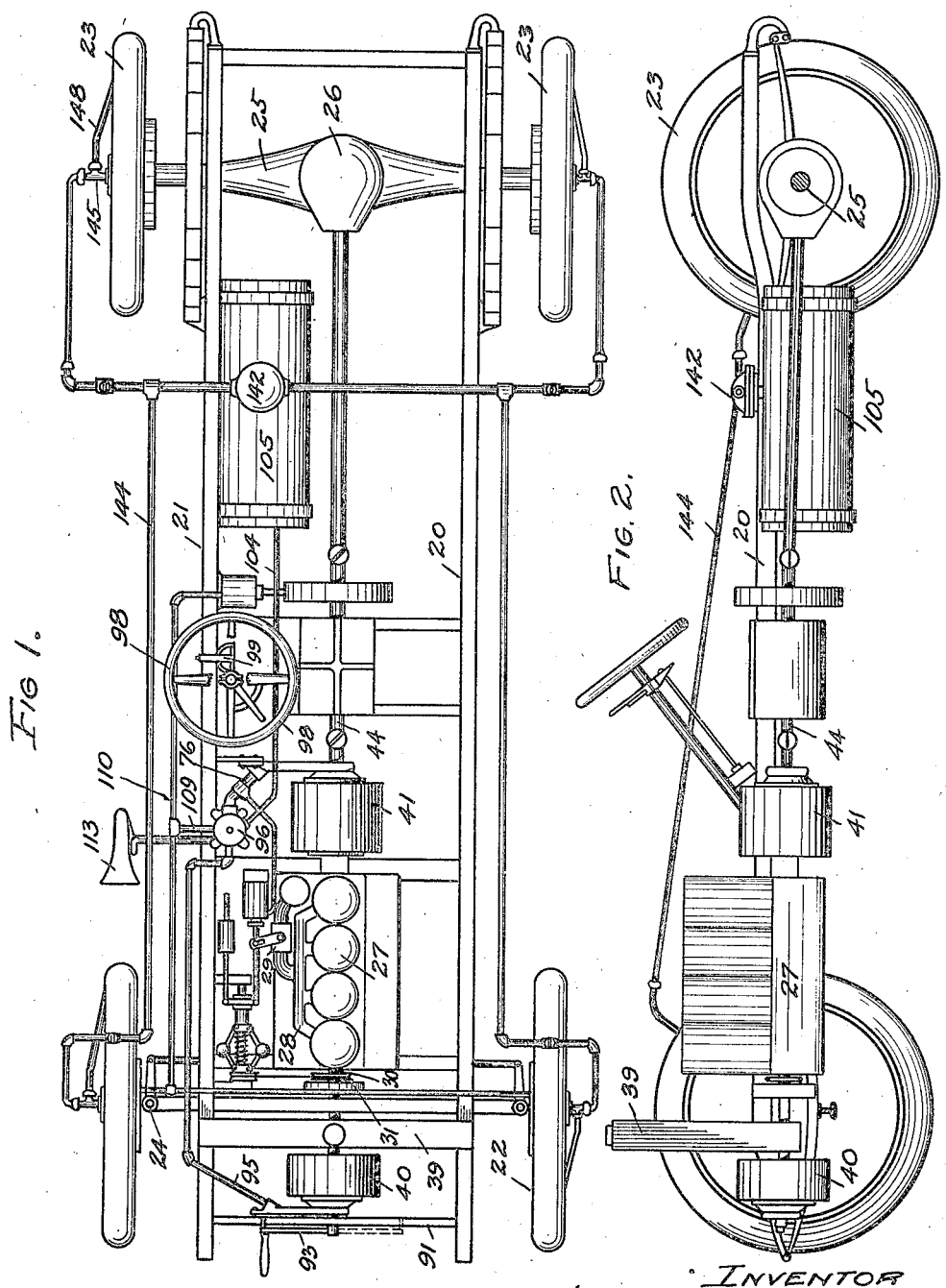

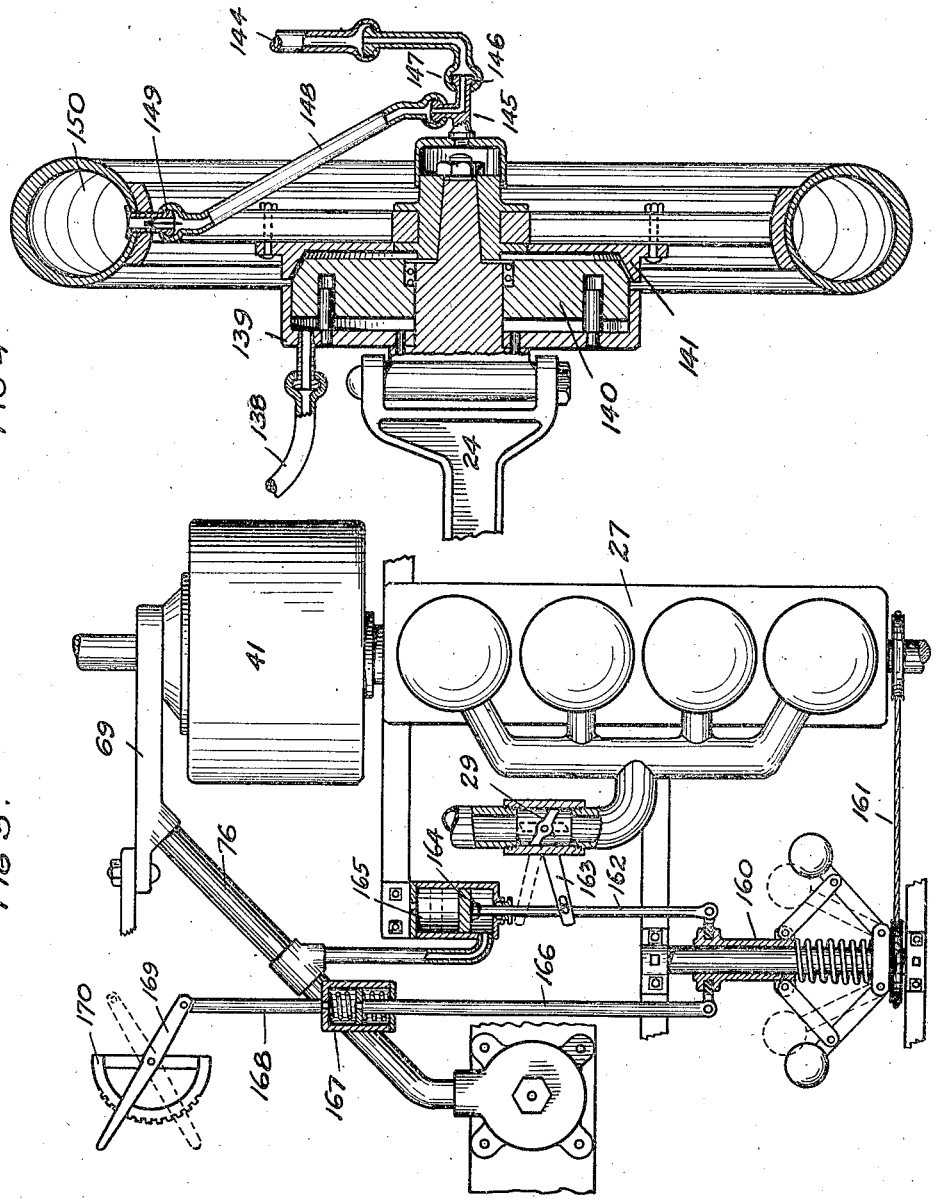

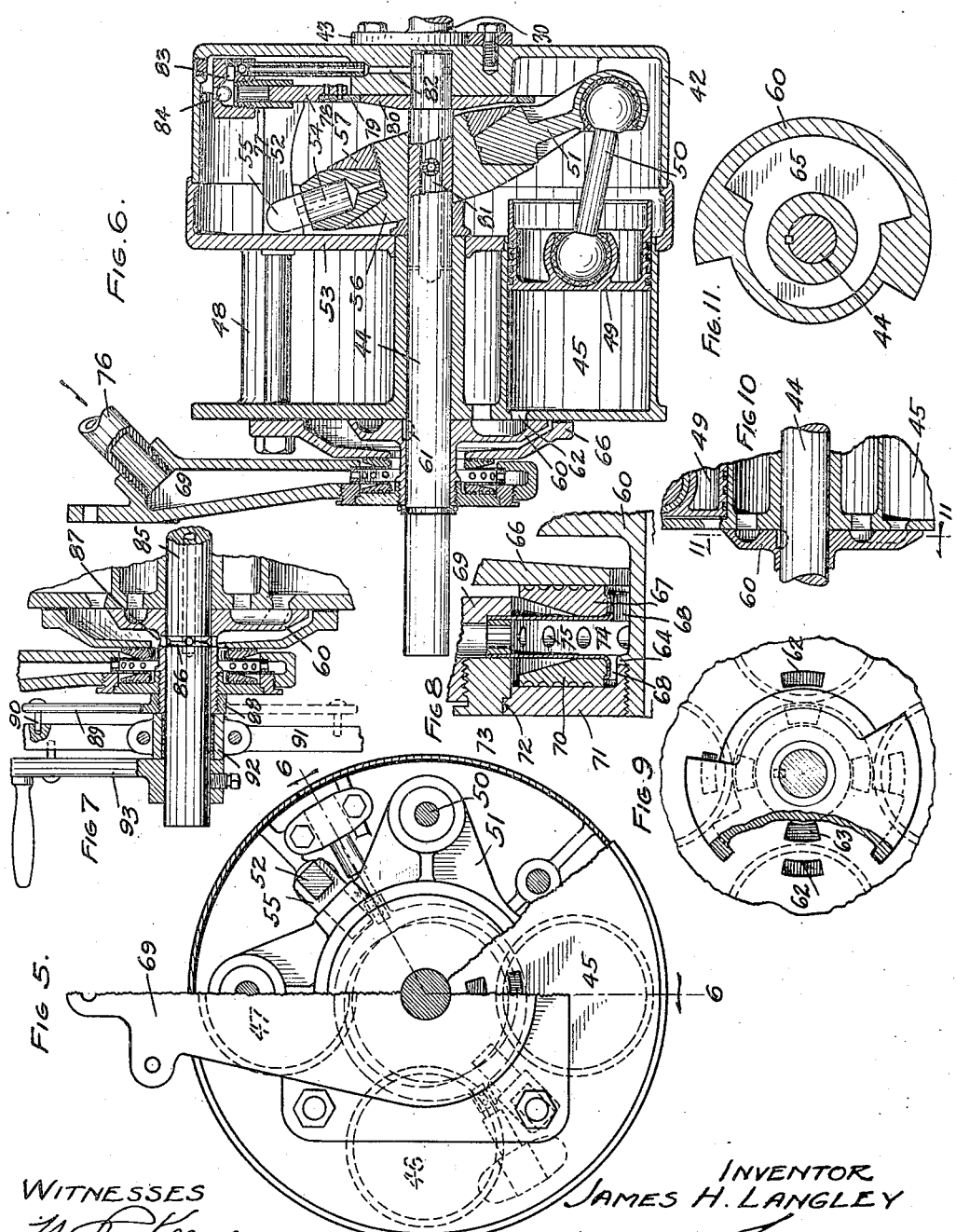

Patented Sept. 12, 1922.

1,428,643

UNITED STATES PATENT OFFICE.

JAMES H. LANGLEY, OF LONG BEACH, CALIFORNIA.

PNEUMATIC CONTROL SYSTEM.

Application filed October 3, 1918. Serial No. 256,654.

*To all whom it may concern:*

Be it known that I, JAMES H. LANGLEY, a citizen of the United States, residing at Long Beach, in the county of Los Angeles and State of California, have invented new and useful Improvements in Pneumatic Control Systems, of which the following is a specification.

This invention relates to improvements in the control of motor propelled vehicles. It is an object to provide an automatic control system applicable to motor propelled vehicles.

It is also an object to provide a pneumatic control system in which the prime mover and its connections may be positively set to maintain a predetermined speed for the vehicles, and this speed maintained by the automatic control irrespective of changes in the grade or more difficult road conditions.

It is also an object to provide a motor propelled vehicle having a prime mover with a fluid clutch.

It is also an object to provide a motor propelled vehicle having a prime mover with a fluid clutch which automatically maintains fluid under pressure in a pressure tank.

It is also an object to provide a control valve of simple construction which may be operated to distribute the fluid under pressure to the various moving connections of the vehicle.

It is a further object to provide a brake mechanism pneumatically and automatically operated upon the release of the propelling mechanism.

It is a further object to provide a governing means in connection with positive pneumatic control valve which will automatically open the throttle of the prime mover to take up for added load on the vehicle, to maintain a definite and predetermined speed.

In the drawings accompanying this specification—

Fig. 1 is a plan view showing an automobile frame with the body removed, showing all the working connections.

Fig. 2 is a longitudinal sectional elevation showing all the working connections in elevation.

Fig. 3 is an enlarged detail in plan, partly in section, of the automatic throttle governing mechanism.

Fig. 4 is an enlarged detail axial section of a front automobile wheel, showing the pneumatic brake and the pneumatic supply connections to the tire.

Fig. 5 is an enlarged end elevation of the clutch and self starter member, a portion being broken away to show the interior arrangement of the rotating and wobbling spider.

Fig. 6 is a section taken on line 6—6 of Fig. 5 viewed in the direction indicated by the arrows.

Fig. 7 is a detail section through a portion of the self-starter, its valve, and the forward end of the crank shaft of the starter.

Fig. 8 is an enlarged detail in section of the valve discs.

Fig. 9 is an end view of the cylinder casing showing the ports, the control valve being shown in elevation and partly in section uncovering a number of the ports.

Fig. 10 is an axial section showing the ports in different relation than that shown in Fig. 6.

Fig. 11 is a section of the valve, on the line 11—11 of Fig. 10 looking in the direction of the arrows.

Fig. 12 is a sectional detail of the self-starter shaft and its clutch mechanism to the crank shaft of the prime mover.

Fig. 13 is a sectional detail partly in elevation of the pneumatic band brake applied to the driving shaft.

Fig. 14 is a plan view of the control valve.

Fig. 15 is an axial section thereof on the line 15—15 of Fig. 14, viewed in the direction indicated by the arrows.

Fig. 16 is a bottom view of the valve, the pipe connection thereto being shown in section.

Fig. 17 is a section of the valve disc on the line 17—17 of Fig. 15, looking in the direction indicated by the arrows, showing the location of the ports.

Fig. 18 is an enlarged detail of the control lever and its notched semi-circular segment.

More specifically in the drawings, 20 and 21 designate the side bars of an automobile frame of the standard type, provided with forward wheels 22 and rear wheels 23. The forward wheels are mounted on the steering brackets 24, the rear wheels being connected by means of a suitable axle 25, in which is enclosed the direct driving mechanism 26, together with the differential gear common to this type of vehicle.

Mounted in the usual position on the frame, is the prime mover 27, shown as a four cylinder internal combustion engine, provided with the intake 28, and throttle valve 29. This prime mover is provided with the usual crank shaft 30, provided at its forward end with a clutch face 31 secured rigidly thereto by means of suitable keying means, which is adapted to be engaged by the fluid operated clutch member 32, which acts as a piston within the casing 33 secured to the hollow shaft 34, a port 35 leading from the central bore of the shaft to the chamber behind the piston clutch member. This clutch member is guided in its movement by the studs 36 which are secured to the casing 33, and slide in suitable bores formed in the inner face of the clutch member, so that it is easily reciprocated the short distance required and held thereby in positive relation to the casing.

Also connected to the hollow shaft 34, is the casing 38 of the self-starter member 40, preferably located forward of the radiator 39. This casing is secured to the shaft 34 by suitable fastenings so that the shaft of the self starter is in alignment therewith, and the bores in the two shafts register to provide a clear passageway for the flow of the compressed fluid. More specifically, this self starter 40 is similar in construction, though shown of smaller size, to the clutch member 41, secured by means of its casing 42 directly to the flanged face 43 on the oppositely disposed end of the crank shaft 30 of the prime mover.

This casing 42 is of a general cylindrical configuration, provided with a shaft 44, which extends from the bearing in the face of the casing adjacent the prime mover connection outwardly beyond the casing, to any desired distance, and is shown connected directly to the reversing gear 171 intermediate the differential gear 26 on the rear axle.

Oppositely disposed from the journal face, and surrounding the shaft, are formed a plurality of cylinders 45, 46, 47 and 48, within which are mounted suitable pistons. The piston in the cylinder 45 being designated 49, each cylinder having its individual piston connected by the piston rods 50, which are shown as universally mounted rods in each of their pivotal points, one being on the spider 51, which is provided with a plurality of arms equal in number to the number of cylinders shown, the relation of the spider to its pistons, their cylinders, and the casing, being fixed by any desired means.

The means shown in this application consists of the guide bar 52 which is located intermediate of two cylinders, and extends from the partition 53 in the casing forming the open ends of the cylinders, to the end wall 42 previously described as secured to the prime mover shaft. Two of these cross bars are shown at oppositely disposed points within the casing, and mounted in a suitable bore in the spider is the stem 54 of the yoke 55, which embraces and straddles the guidebar 52. The spider 51 is revolubly mounted in relation to the shaft 44, the bearing thereon being provided by the inclined block 56 which is securely keyed to the shaft, the spider being provided with suitable bearing surface to engage with this inclined block 56 which is securely keyed to the shaft, the spider being provided with suitable bearing surface to engage with this inclined block and secured thereon by means of the bearing ring 57 threaded upon the block.

Each one of the four cylinders is provided with a port 62 which is controlled by means of the valve 60, which in the clutch member 41 is keyed to the shaft by means of a key 61. This valve has a disc face in engagement with the seats adjacent the various ports, and is adapted to connect the ports 62 of the cylinders alternately with the source of fluid under pressure, or the exhaust ports 63. The valve is of general disc configuration, provided with a sleeve, which extends outwardly from the casing and embraces the shaft, the outer end being threaded beyond the shoulder 64 formed on the outer periphery of this sleeve. The face of the valve and the configuration of the ports, are clearly shown in the sectional view Fig. 11, this section being carried at right angles to the axis, so as to cut the control port 65. A large portion of the valve is cut away to permit of entrance to the port 62 of the pressure conveyed to the valve chamber.

This valve chamber is composed of a disc casing 66 which is secured to the cylinder casing, its concentric opening being of greater diameter than the external diameter of the sleeve of the valve. The outer facing of this casing 66 is surfaced to receive the bearing ring 67 held in concentric relation to the shaft and the sleeve, by means of the expansion ring 68 secured in the pressure inlet casing 69. A pair of these bearing rings 67 and 70 are shown placed in parallel relation, ring 70 being adapted to bear upon ring 71, which is threaded onto the end of the sleeve, and is provided with a bearing surface 72 which engages with a shoulder on the ring 73, which is threaded onto the concentric opening in the pressure inlet frame 69.

This ring 73 also compresses and secures in position the two pressure discs 68, which as shown are thin discs of metal which are in engagement with their respective rings 67 and 70, and are held in spaced relation by means of the ring 74, which is provided with the radially disposed ports 75. This ring is held in positive contact in the frame by means of the compression spring 73. The pressure conveyed through the pipe 76 to this valve chamber exerts a pressure upon the disc 68 so that a tight contact is made by the bearing discs 67 and 70, which are grooved on their engaging faces, the grooves being slightly eccentric so that lubrication is complete over their contacting surfaces.

To provide for proper lubrication, the spider chamber is provided with a pump, shown as a cylinder 77, in which is reciprocated piston 78 in a radial direction by means of the eccentric strap 79, which embraces the eccentric 80, this eccentric being securely keyed to the shaft adjacent its bearing in the end wall. This portion of the shaft is preferably provided with a central bore 81 which is connected by means of a bore 82 to the pump chamber 83, the entrance to this pump chamber being controlled by the valve 84 placed close to the inner periphery of the casing so that the centrifugal action carries the oil to its peripheral surface, and the pump is in position to carry it from this position and distribute it through the hollow shaft and connections therefrom to the various moving parts, as clearly shown.

The modification of the clutch member to form the self-starter is clearly shown in Figs. 7 and 12, the starter having a hollow shaft 85 which extends from its outer casing to an annular groove 86 in its periphery, which in turn affords access to a plurality of bores 87 in the sleeve of the disc valve 60. This valve 60 in the starting mechanism is free on the shaft, and is connected by means of the ring 88 to the arm 89, which is provided with a locking pin 90 on its outer end, which is adapted to engage as desired with bores in the cross frame 91 of the main frame of the vehicle. Shaft 85 is extended through the bearing 92 formed in this cross bar, and keyed thereto in a common manner is the crank arm 93, which is also provided with locking pin 94 adapted to lock in a bore of cross frame 91.

A pipe 95 connects the air starter valve chamber to the control valve 96, which is preferably mounted in line with the steering post of the vehicle, and so placed that its operating shaft 97 can be carried in parallel relation with the steering post of the vehicle and terminate in suitable position under the steering wheel 98 with an operating handle 99.

The valve proper consists of a casing 100 into which are threaded a plurality of pipes. An axial exhaust pipe 101 is provided which enters the valve seat concentrically surrounding which are a plurality of ports which communicate with the valve chamber provided with the disc valve 102, which normally seats by pressure admitted into the valve chamber through the ports 103 connected by the pipe 104 to the pressure tank 105.

Adapted to be closed by the valve is the port 106 connected by the pipe 76 to the non-reversible clutch member 41. In the valve seat is the port 107 connected by the pipe 95 to the self-starter. Next comes the port 108 connected by the pipe 109 to the branch pipe 110 leading to the pneumatically operated brakes described hereafter. The next port is that designated 111, which is connected by the pipe 112 to a horn 113. The valve itself is provided with a port 114 of small size, which extends clear through the disc and affords communication from the pressure chamber of the valve to the various ports. Next to the port 114 is the channel 115, which is greater in width and length, so that it affords communication between the ports in the valve seat to the exhaust pipe 101. Channel 116 oppositely disposed from the port 114, is of larger size, but only a shallow channel affording communication from the port 106 alone to the exhaust port. The channel 117 is also shallow and alternately affords communication between the port 107 and 108 to the exhaust 101.

In the casing forming the pressure chamber for the valve a by-pass is formed between the pipe 76 and the pressure chamber of the valve, which is controlled by means of the pressure actuated valve 118, and is normally seated by means of the coil spring 119.

A suitable stuffing box 120 forms a tight joint for the operating shaft 97, which is securely keyed to the valve disc. As previously stated, this valve stem is supplied with a handle 99, which has a latch 121 which engages with the notches in the segment 122, secured by the bracket 123 to the steering post. This locking latch is spring actuated by means of the coil spring 124, the latch being released by depressing the plunger 125 projecting from a longitudinal bore in the handle.

As shown in Fig. 18, the latch 121 is in engagement with a shoulder 126 formed on the segment, the valve being in the position with the port 114 delivering air through the port 108 to the brakes. Movement of the handle toward the operator throws the port 117 to release the brakes at the notch 128, from which point around to the notch 129, the amount of air delivered by the clutch member 41 is gradually cut off until there is no movement within the clutch, and its shaft revolves at the same rate of speed as the prime mover shaft. The further movement up the incline 130 throws air through the port 108 to a horn without effecting the speed of the clutch member. Movement of the handle in the reverse direction passed the shoulder 126 to the notch 131 throws air into the self-starter, and the further movement of the notch 132 releases the brake through the port 115, and the self-starter may be used to drive the vehicle at this point for emergency purposes, the clutch being "on".

The pipe 110 leads to a cylinder in which is mounted the piston 135 which operates the band brake 136 encircling the band wheel 137 keyed to the shaft 44. The forward end of the pipe 110 by means of flexible connection 138, connects with the casing 139 mounted on the short axle of each front wheel, this casing carrying a piston 140 of similar construction to that described for the clutch member intermediate of the prime mover and self-starter, its clutch face engaging with a clutch ring 141 secured to the spokes of the front wheel mounted on the adjacent axle.

To provide for the inflation of the tires, a reducing valve 142 is connected with air tank 105 and air is distributed through a branch piping 144 which is connected to a fitting 145 secured to the hub of each wheel, this fitting being provided with a nipple 146 embraced by the cap 147, so that a running joint is provided. The angular bore through the fitting 145 is connected by a radial connector pipe 148 to the valve 149 of the tire 150. Air may be turned in this pipe continuously, or only supplied when a leak has been discovered, without delaying the machine, until it is convenient, or time can be taken to repair the cause of the loss of pressure.

The automatic operation of the prime mover is effected by means of a governor 160 which is connected by means of a belt 161 to the crank shaft of the prime mover. The sleeve of the governor is directly connected by the rod 162 with the throttle control lever 163, the opposite end of the rod being connected to a piston 164 mounted in a cylinder 165. The branch connecting with the pipe 76 from the clutch member 41 carries air to the piston against the action of the governor, so that the pressure built up within the clutch member equalizes the action of the governor in the operation of the throttle. The governor sleeve is also connected by rod 166 to an equalizer 167 which is connected by the rod 168 to the throttle operating lever 169, which can be located on the segment 170 in any well known manner, the open position of the throttle being shown in dotted lines, the solid lines representing the closed position with the engine practically inoperative.

The operation of the control system will be readily understood from the above, and by fixing the throttle control lever so that the prime mover may be run at its most economical and efficient speed, and the speed of the vehicle regulated independently by the control valve alone, without jar, jerks or vibrations due to irregular running of the prime mover and operation of the mechanical clutches.

From the foregoing it will be seen that cutting off of the propelling power automatically operates to apply the brakes to retard the movement of the vehicle and eventually bring it to a stop, and when starting from a stopped position by allowing escape of the clutch pressure the speed can be gradually increased until the speed desired is obtained up to the set speed of the prime mover. This latter operation is effected by the operation of the valve alone, and from this point increase in speed is obtained by the throttle valve control.

What I claim is:

1. In a pneumatically controlled transmission system for vehicles, the combination of a prime mover; a shaft secured to said prime mover comprising independent sections; a pneumatic starting mechanism; a pneumatic clutch comprising a casing secured to a section of said shaft, pistons mounted within said casing and secured to another section of said shaft; an air reservoir; pneumatic brake mechanism; a pneumatic horn; a valve connected to the aforesaid pneumatic starting mechanism, pneumatic clutch, air reservoir, pneumatic brake mechanism, and pneumatic horn, whereby in one position of said valve said starter is placed in communication with said air reservoir and the clutch is released; in another position of the brakes said starter is placed in communication with said reservoir, the clutch released and the brakes released; in another position the brakes are set, the starter connected to exhaust and the clutch connected to exhaust; in another position the brakes are released and the discharge of air by the clutch retarded; in another position the horn is connected to the air reservoir; and a bypass having pressure controlled mechanism to connect the clutch and the air reservoir at a given pressure.

2. In a pneumatically controlled power transmission system for vehicles, the combination of a prime mover; a shaft secured thereto comprising independent sections; a pneumatic starting mechanism; a pneumatic clutch comprising a casing secured to a shaft section, pistons mounted within said casing and secured to another shaft section; an air reservoir; pneumatic brake mechanism; a pneumatic horn; a valve casing having connections to the atmosphere, the air reservoir, the pneumatic starter, pneumatic brake mechanism, pneumatic horn, pneumatic clutch, a rotary disc provided with a port to connect said air reservoir with said pneumatic starter, pneumatic brakes or pneumatic horn, and a pressure controlled valve in said valve casing connecting said pneumatic clutch and said air reservoir.

3. In a pneumatically controlled power transmission system for vehicles, the combination of a prime mover provided with a throttle valve, a power shaft secured to said prime mover, a pneumatic clutch comprising a casing secured to a section of said shaft, pistons in said casing connected to an independent section of said shaft, a speed governor geared to said engine, a pneumatic casing connected to said clutch, means connecting said pneumatic casing and said governor, and operating means secured to said throttle valve and to the aforesaid means.

4. In a pneumatically controlled power transmission system, the combination of a prime mover provided with a throttle valve, a power shaft secured to said prime mover, a power clutch comprising a casing secured to a section of said shaft, pistons in said casing secured to an independent section of said shaft, a speed governor geared to said engine, a pneumatic casing connected to said clutch, a movable septum secured within said pneumatic casing, a rod connecting said speed governor and septum, means connecting said rod and said throttle valve, a throttle operating rod secured to said first mentioned rod, a resilient means connecting said throttle operating rod and a throttle lever.

In witness that I claim the foregoing I have hereunto subscribed my name this 29th day of July, 1918.

JAMES H. LANGLEY.